(12) United States Patent
Laredo et al.

(10) Patent No.: US 10,528,965 B2
(45) Date of Patent: Jan. 7, 2020

(54) BUNDLING APPLICATION PROGRAMMING INTERFACES

(71) Applicant: International Business Machines Corporation, Armonk, NY (US)

(72) Inventors: Jim A. Laredo, Katonah, NY (US); Arjun Natarajan, Old Tappan, NJ (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 14/198,780

(22) Filed: Mar. 6, 2014

(65) Prior Publication Data

US 2015/0254701 A1    Sep. 10, 2015

(51) Int. Cl.
  *G05B 19/05*    (2006.01)
  *G06Q 30/02*    (2012.01)
  *G06Q 50/18*    (2012.01)

(52) U.S. Cl.
  CPC ..... *G06Q 30/0222* (2013.01); *G06Q 30/0283* (2013.01); *G06Q 50/188* (2013.01)

(58) Field of Classification Search
  USPC ....... 709/223; 705/7.11; 379/266.07, 265.09; 726/1
  See application file for complete search history.

(56) References Cited

U.S. PATENT DOCUMENTS

| | | | | |
|---|---|---|---|---|
| 2012/0239515 | A1* | 9/2012 | Batra | G06Q 30/0631 705/26.1 |
| 2012/0254899 | A1* | 10/2012 | Sharma | G06F 9/541 719/328 |
| 2013/0138563 | A1* | 5/2013 | Gilder | G06Q 20/4016 705/44 |
| 2014/0095341 | A1* | 4/2014 | Woods | G06Q 30/06 705/26.5 |

OTHER PUBLICATIONS

Gallego et al.,"Service Engineering: The Future of Service Feature Design and Pricing," Working Paper Series: No. 2010-2, Columbia University, Dec. 2010, 35 pages.

Kephart et al., "Pricing information bundles in a dynamic environment," Proceedings of the 3rd ACM conference on Electronic Commerce, Oct. 2001, 12 pages.

* cited by examiner

*Primary Examiner* — Akiba K Allen
(74) *Attorney, Agent, or Firm* — Yee & Associates, P.C.

(57) ABSTRACT

Bundling application programming interfaces is provided. Related application programming interfaces within a set of application programming interfaces and their corresponding dependent application programming interfaces are combined with related composite application programming interfaces within a set of composite application programming interfaces and their corresponding dependent application programming interfaces to generate a set of application programming interface bundles. The computer prunes the set of application programming interface bundles based on a determined application programming interface budget (Continued)

pattern that corresponds to a selected cluster of application programming interface consumers. The computer prices the pruned set of application programming interface bundles based on an application programming interface bundle pricing model.

16 Claims, 9 Drawing Sheets

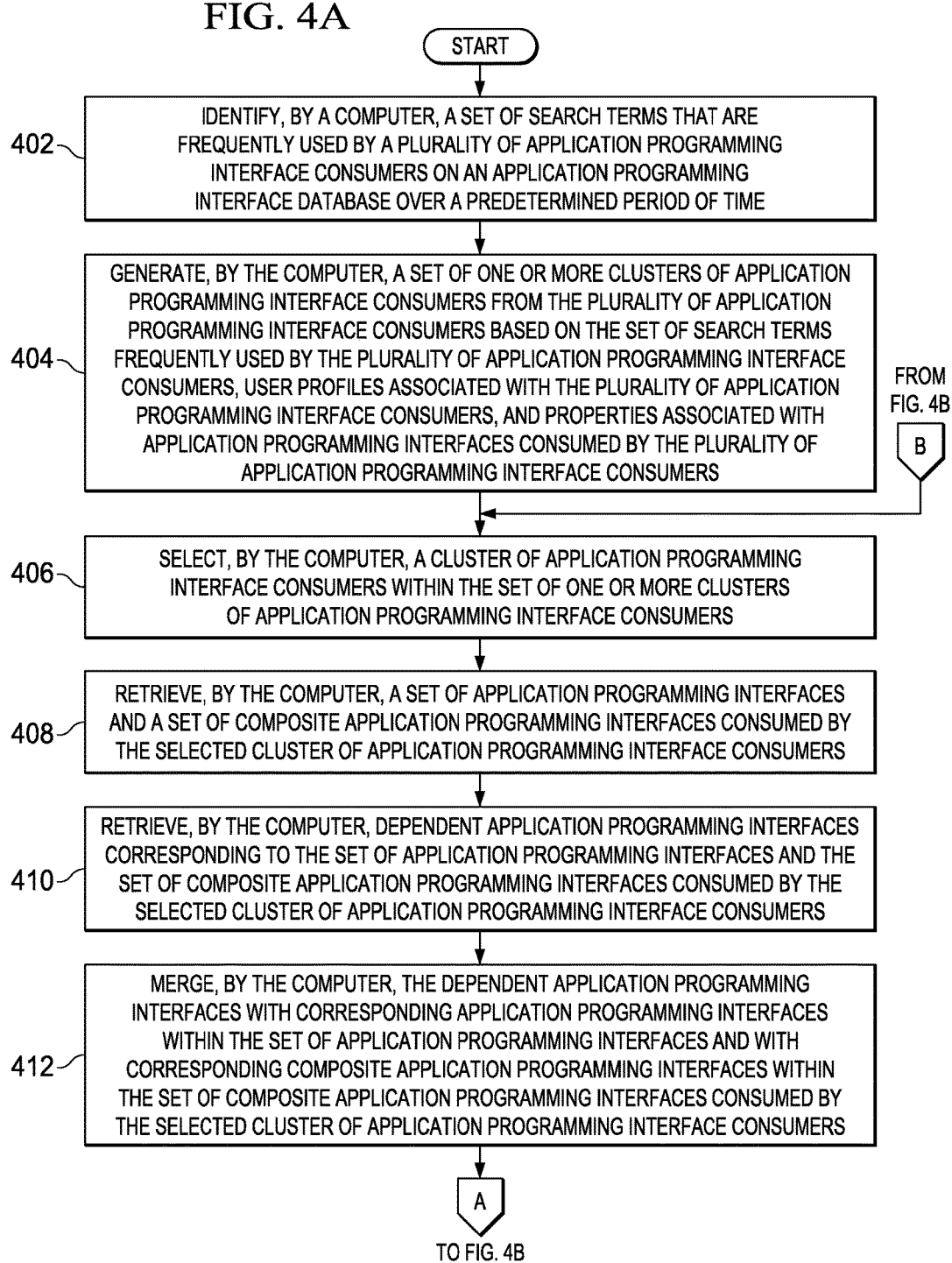

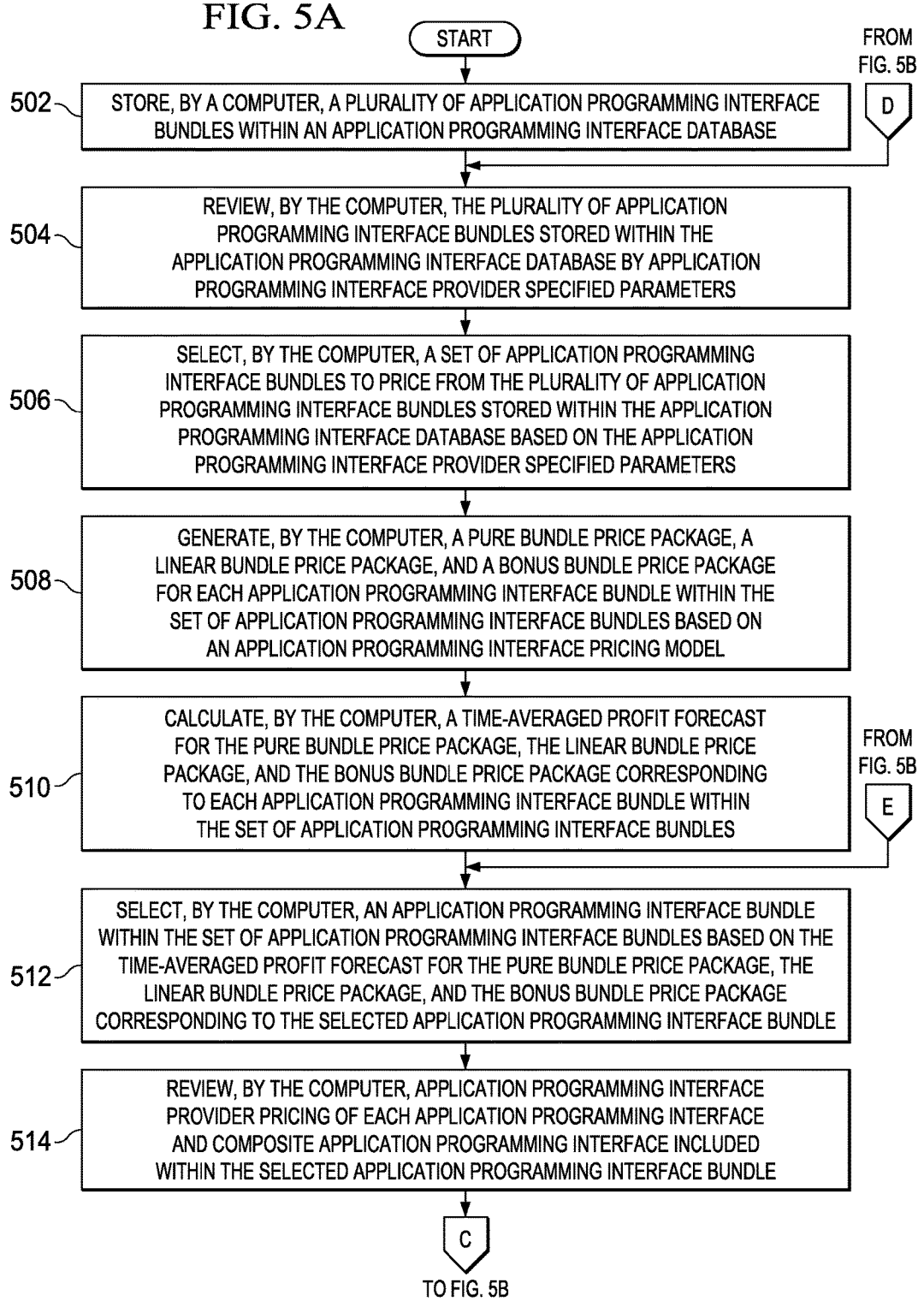

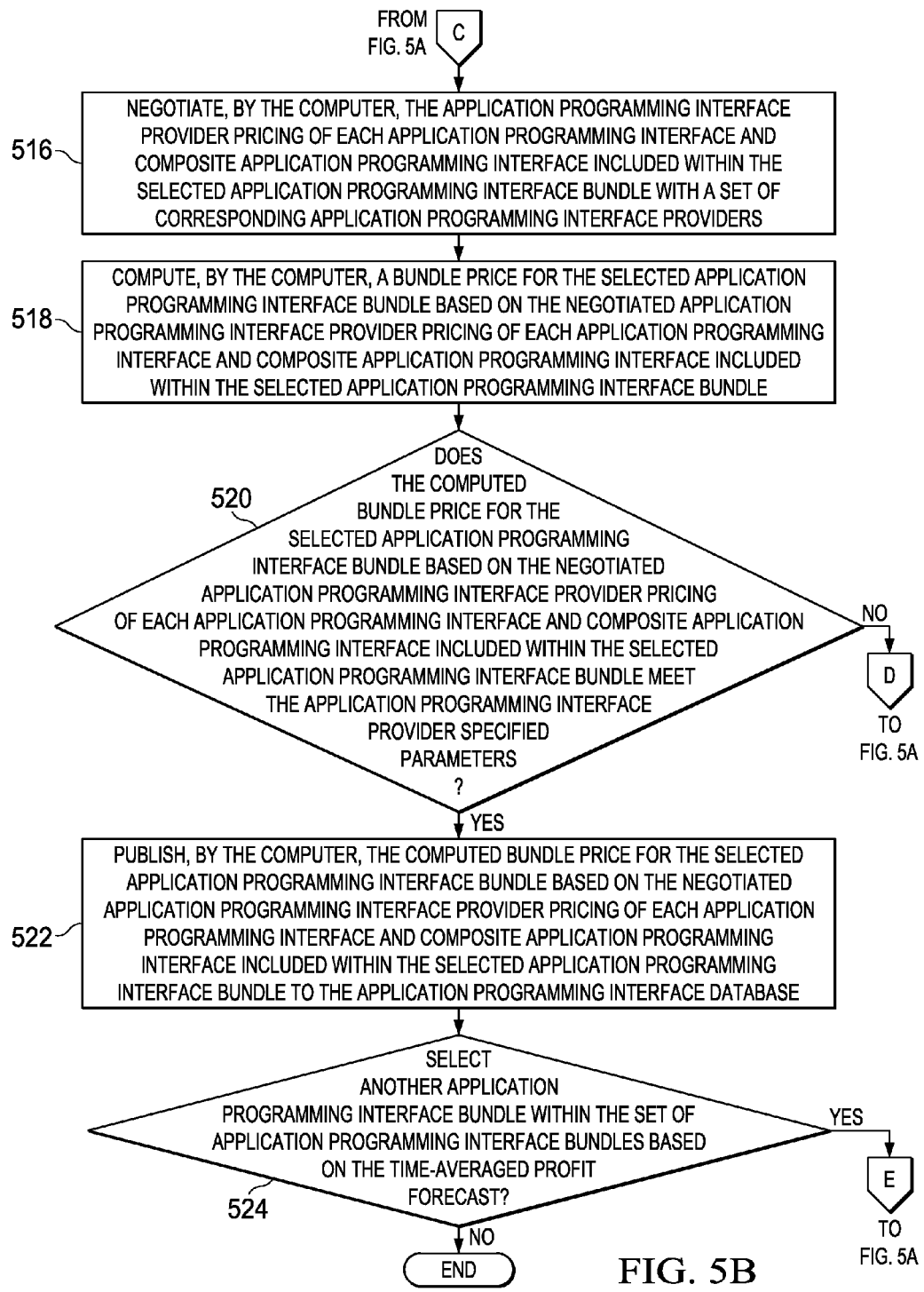

BUNDLING APPLICATION PROGRAMMING INTERFACES

BACKGROUND

1. Field

The disclosure relates generally to application programming interfaces and more specifically to automatically generating bundles of application programming interfaces based on functional and non-functional properties associated with the application programming interfaces within an application programming interface database.

2. Description of the Related Art

An application programming interface (API) is a set of routines, protocols, and tools for building software applications. An application programming interface makes it easier to develop a software application by providing all the basic building blocks. A developer then puts the building blocks together to create the software application. In essence, an application's application program interface defines the proper way for the developer to request services from that application. Although application program interfaces are designed for developers, application program interfaces are good for application program interface consumers because the application program interfaces guarantee that all applications using a common application program interface will have similar interfaces. For Simple Object Access Protocol (SOAP) and Representational State Transfer (REST) services, an application program interface comes as a specification of remote calls exposed to the application program interface consumers.

Application programming interfaces may be used for accessing a Web-based software service or a Web tool. Using application program interfaces, applications are able to talk to each other without any user knowledge or intervention. For example, when a user buys movie tickets online and enters credit card information, the movie ticket Web site uses an application program interface to send the credit card information to a remote application that verifies whether the credit card information is correct. Once payment is confirmed, the remote application sends a response back to the movie ticket Web site indicating that the move ticket Web site may issue the tickets to the user. The user only sees the movie ticket Web site interface, but behind the scenes many applications are working together using application program interfaces to provide the service.

In addition, a developer may publish an application program interface on a social network of application program interface developers so that other developers can design software products that are based on the published application program interface. Publishing application program interfaces online allows application program interface developer communities to create an open architecture for sharing content and data between communities and applications. As a result, software service applications may be based on application program interfaces from multiple developers at all levels, such as, for example, at the application level, the platform level, the infrastructure level, et cetera.

SUMMARY

According to one illustrative embodiment, a computer-implemented method for bundling application programming interfaces is provided. A computer combines related application programming interfaces within a set of application programming interfaces and their corresponding dependent application programming interfaces with related composite application programming interfaces within a set of composite application programming interfaces and their corresponding dependent application programming interfaces to generate a set of application programming interface bundles. The computer prunes the set of application programming interface bundles based on a determined application programming interface budget pattern that corresponds to a selected cluster of application programming interface consumers. The computer prices the pruned set of application programming interface bundles based on an application programming interface bundle pricing model. According to other illustrative embodiments, a computer system and a computer program product for bundling application programming interfaces are provided.

BRIEF DESCRIPTION OF THE SEVERAL VIEWS OF THE DRAWINGS

FIGS. 4A-4B are a flowchart illustrating a process for bundling application programming interfaces in accordance with an illustrative embodiment;

FIGS. 5A-5B are a flowchart illustrating a process for pricing application programming interface bundles in accordance with an illustrative embodiment.

DETAILED DESCRIPTION

Figure 1:
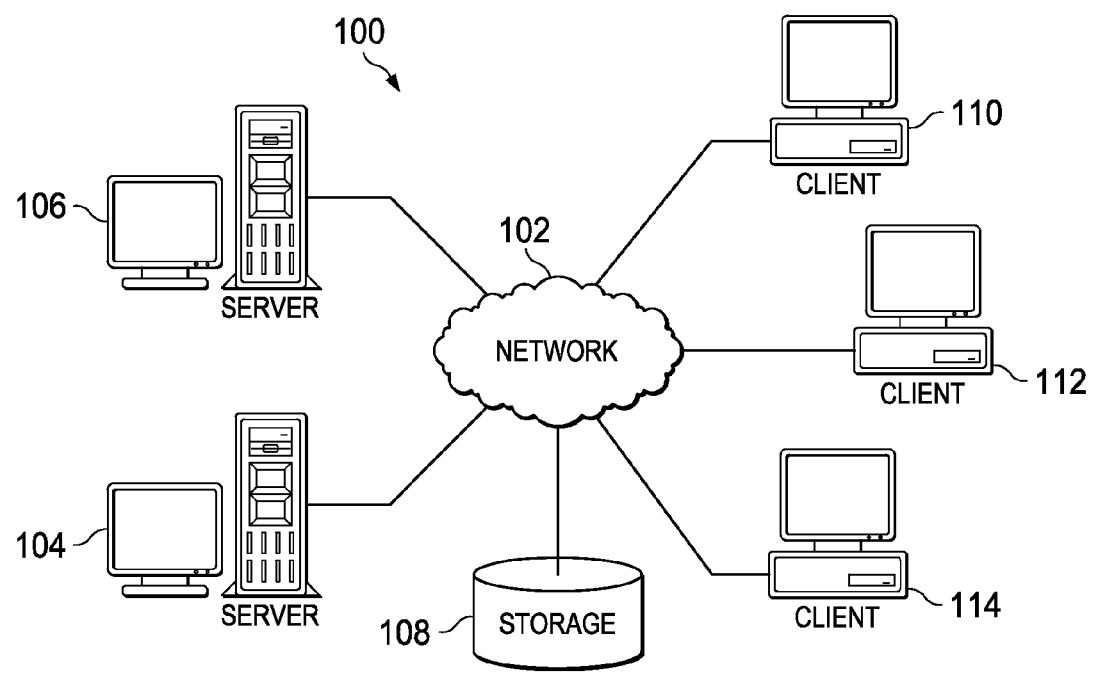
FIG. 1 a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
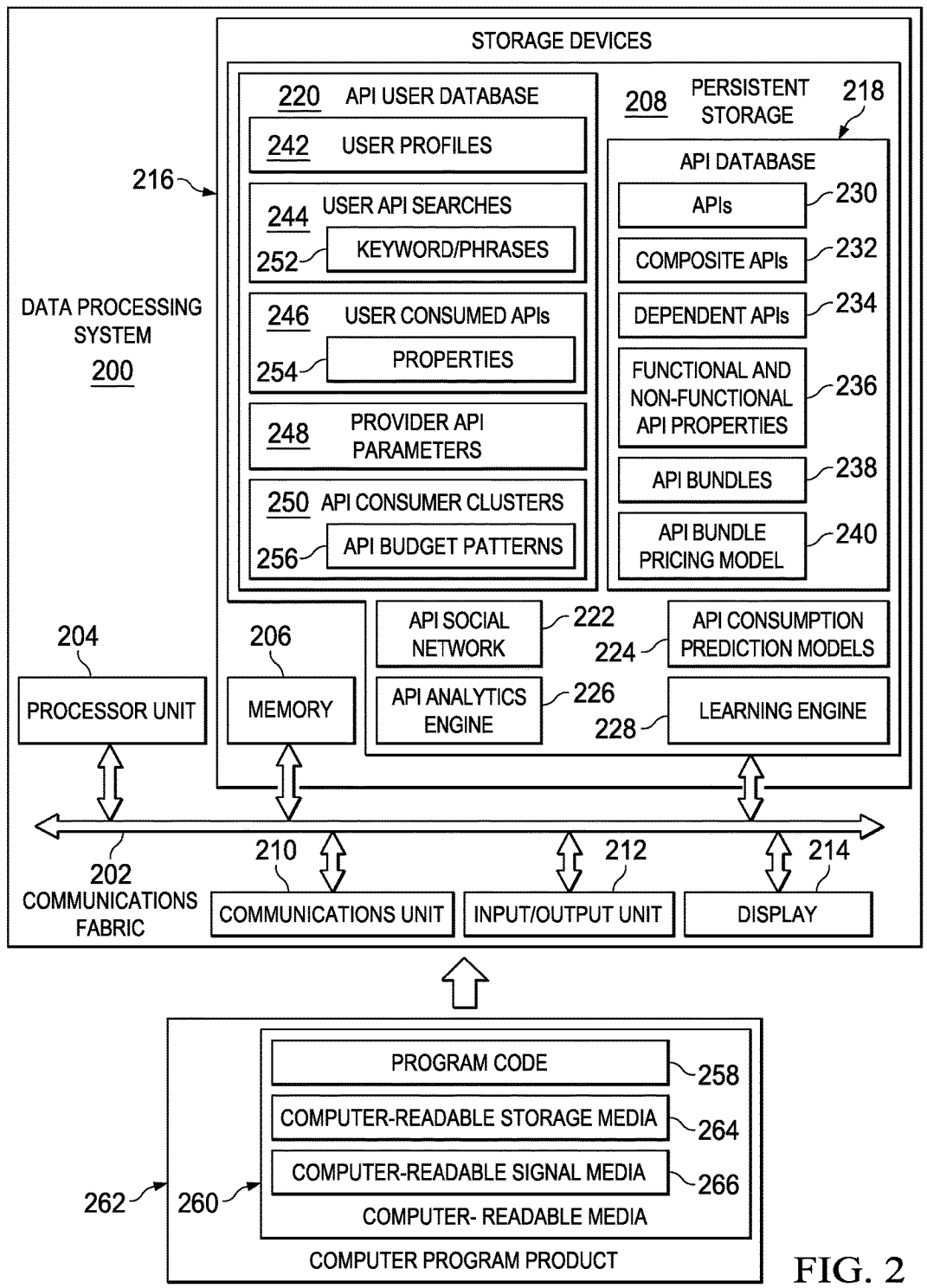
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to client devices connected to network 102. For example, server 104 and/or server 106 may provide a service that automatically bundles application programming interfaces based on functional and non-functional properties associated with the application programming interfaces in an application programming interface database, relationships between the application programming interfaces in the application programming interface database, and a recent history of application programming interface consumption by users associated with client devices connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 may utilize clients 110, 112, and 114 to purchase application programming interface bundles generated by server 104 and/or server 106.

Clients 110, 112, and 114 may be, for example, personal computers, network computers, and/or portable computers, such as laptop computers, with wire and/or wireless communication links to network 102. In addition, clients 110, 112, and 114 also may represent mobile data processing systems, such as cellular telephones, smart phones, personal digital assistants, or handheld computers, with wireless communication links to network 102. It should be noted that clients 110, 112, and 114 may represent any combination of computers and mobile data processing systems connected to network 102.

Storage 108 is a network storage device capable of storing data in a structured or unstructured format. Storage 108 may provide storage for names of a plurality of different users and their associated identification numbers; user profiles and account information for each of the plurality of users; a plurality of different application programming interfaces and composite application programming interfaces, along with their corresponding dependent application programming interfaces; a plurality of different application programming interface bundles; and a set of application programming interface pricing models. Further, storage unit 108 may store other data, such as authentication or credential data that may include user names, passwords, and biometric data associated with each of the plurality of users and system administrators.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application programming interface database 218, application programming interface user database 220, application programming interface social network 222, application programming interface consumption prediction models 224, application programming interface analytics engine 226, and learning engine 228. However, it should be noted that persistent storage 208 may store any type of application, program, module, and/or data utilized by different illustrative embodiments.

Application programming interface database 218 stores application programming interfaces 230, composite application programming interfaces 232, dependent application programming interfaces 234, functional and non-functional application programming interface properties 236, application programming interface bundles 238, and application programming interface bundle pricing model 240. Application programming interfaces 230 represent a plurality of different application programming interfaces developed by a plurality of different developers/providers of application programming interfaces. Composite application programming interfaces 232 represent a plurality of different composite application programming interfaces. A composite application programming interface is a set of two or more different application programming interfaces that are combined together to provide enhanced functionality. The different application programming interfaces included in a composite application programming interface may be developed by one developer or by different developers.

Dependent application programming interfaces 234 represent a plurality of different dependent application programming interfaces that depend on one or more application programming interfaces within application programming interfaces 230 and/or one or more composite application programming interfaces within composite application programming interfaces 232. In addition, dependent application programming interfaces 234 may represent application programming interfaces that application programming interfaces 230 and/or composite application programming interfaces 232 are dependent upon.

Functional and non-functional application programming interface properties 236 represent attributes or characteristics of application programming interfaces and composite application programming interfaces. Functional application programming interface properties may be, for example, capabilities of a particular application programming interface or composite application programming interface and performance of the particular application programming interface or composite application programming interface. Non-functional application programming interface properties may be, for example, enterprise requirements of a particular application programming interface or composite application programming interface and information technology (IT) constraints on the particular application programming interface or composite application programming interface.

Application programming interface bundles 238 represent a plurality of different application programming interface bundles. An application programming interface bundle is a group of different application programming interfaces and/or composite application programming interfaces bundled together. The group of different application programming interfaces and/or composite application programming interfaces is priced as a bundle based on Application programming interface bundle pricing model 240.

Application programming interface bundle pricing model 240 represent a set of one or more different application programming interface bundle pricing models. An application programming interface bundle pricing model sets price parameters and profits per application programming interface bundle per application programming interface consumer for each different bundle price package. The different bundle price packages may be, for example, a pure bundle price package, a linear bundle price package, and an n-part bonus bundle price package. An example of a pure bundle price package may be that application programming interface consumers pay a fixed price for all "N" application programming interfaces of a same type. For example, when a consumer subscribes to all N application programming interfaces of the same type, the consumer receives a 50 percent bonus over $1*N. An example of a linear bundle price package may be that application programming interface consumers pay a fixed price for each individual composite application programming interface of a particular type. For example, a consumer pays $1 for each human resource (HR) composite application programming interface. An example, of an n-part bonus bundle price package may be that application programming interface consumers receive incremental rewards to motivate consumers to subscribe to more application programming interfaces and/or composite application programming interfaces. For example, a consumer may pay $1 for subscribing to one application programming interface or composite application programming interface, $1-0.1 for subscribing to two application programming interfaces or composite application programming interfaces, $1-0.2 for subscribing to three application programming interfaces or composite application programming interfaces, and so forth.

Application programming interface user database 220 stores names and identification numbers associated with a plurality of different application programming interface users. An application programming interface user may be an application programming interface developer/provider or may be an application programming interface consumer. An application programming interface developer/provider creates and publishes application programming interfaces for use by application programming interface consumers. Application programming interface consumers use the published application programming interfaces to create new software service applications or modify existing software service applications.

Application programming interface user database 220 also stores user profiles 242, user application programming interface searches 244, user consumed application programming interfaces 246, provider application programming interface parameters 248, and application programming interface consumer clusters 250. User profiles 242 represent a plurality of different profiles for the plurality of different users. In other words, each user within application programming interface user database 220 is associated with a set of one or more profiles within profiles 242. Each profile may contain information, such as, for example, name and identifier of a particular user; account information associated with the particular user; a user name, password, and biometric data associated with the particular user; a role and/or position of the particular user within an enterprise; location of the particular user (e.g., city, state, region, or country the particular user is located within); names and identifiers of all application programming interfaces and composite application programming interfaces consumed by the particular user; the number of application programming interfaces and composite application programming interfaces consumed by the particular user, an application programming interface consumer start date associated with the particular user; and an application programming interface cost, such as, for example, $1, that corresponds to each application programming interface invocation by the particular user.

User application programming interface searches 244 represent a plurality of different application programming interface searches performed by the plurality of different users on application programming interface database 218. User application programming interface searches 244 include keywords/phrases 252. Keywords/phrases 252 represent a plurality of different search terms frequently used by the plurality of different users over a predetermined period of time to locate particular application programming interfaces and/or composite application programming interfaces. The predetermined period of time may be, for example, one week, one month, three months, six months, one year, or any other increment of time, such as minutes, hours, or days.

User consumed application programming interfaces 246 represent a plurality of different application programming interfaces and/or composite application programming interfaces consumed by the plurality of different users. In other words, application programming interface user database 220 associates each particular user with the application programming interfaces and composite application programming interfaces consumed by that particular user. In addition, user consumed application programming interfaces 246 include properties 254. Properties 254 are functional and/or non-functional properties, such as functional and non-functional application programming interface properties 236, corresponding to each of the consumed application programming interfaces and composite application programming interfaces.

Provider application programming interface parameters 248 represent a plurality of different parameters specified by application programming interface providers that correspond to different application programming interfaces and/or composite application programming interfaces. The provider specified parameters may be, for example, functionality of a particular application programming interface or composite application programming interface, availability of the particular application programming interface or composite application programming interface, performance of the particular application programming interface or composite application programming interface, size of an application programming interface consumer group that is consuming that particular application programming interface or composite application programming interface, and a particular segment of application programming interface consumers consuming the particular application programming interface or composite application programming interface.

Application programming interface consumer clusters 250 represent a set of one or more clusters or groups of consumers of application programming interfaces. Each cluster of application programming interface consumers may be based on, for example, a set of search terms frequently used by the plurality of users, such as keywords/phrases 252, user profiles 242 associated with the users, and properties 254 associated with user consumed application programming interfaces 246 consumed by the plurality of users. Application programming interface consumer clusters 250 include application programming interface budget patterns 256. Application programming interface budget patterns 256 represent a plurality of different budget patterns corresponding to each different cluster of application programming interface consumers within application programming interface consumer clusters 250. A budget pattern is an amount of money a particular cluster of application programming interface consumers has paid for application programming interface bundles over a predetermined period of time. In addition, a budget pattern may include an amount of money the particular cluster of application programming interface consumers is willing to pay (i.e., desired budget) for application programming interface bundles.

Application programming interface social network 222 stores information regarding social networks of application programming interface developers and consumers associated with each of the users listed within application programming interface user database 220. Data processing system 200 utilizes the information within application programming interface social network 222 to mine data on the social networks regarding application programming interfaces and composite application programming interfaces developed and/or consumed by the plurality of users. Data processing system 200 also may utilize the information within application programming interface social network 222 to monitor the social networks for network integrity and security purposes.

Application programming interface consumption prediction models 224 represent a plurality of different application programming interface consumption prediction models that correspond to the plurality of different users. Data processing system 200 may generate a set of one or more application programming interface consumption prediction models for each user. Data processing system 200 may utilize a set of application programming interface consumption prediction models corresponding to a particular user to automatically generate a set of one or more application programming interface bundles for that particular user. Data processing system 200 may generate the set of application programming interface consumption prediction models corresponding to the particular user based on application programming interfaces associated with the user and their dependent application programming interfaces, software service applications related to the application programming interfaces associated with the user and their dependent application programming interfaces, a set of most consumed application programming interfaces corresponding to the user and the software service applications related to the application programming interfaces associated with the user based on an application programming interface consumption history, a set of users related to the set of most consumed application programming interfaces, and application programming interfaces and their dependent application programming interfaces associated with the set of related users.

Application programming interface analytics engine 226 is a data model that diagrams relationships between the information within application programming interface database 218, application programming interface user database 220, application programming interface social network 222, and application programming interface consumption prediction models 224. Data processing system 200 may utilize application programming interface analytics engine 226 to determine relationships between a particular user, application programming interfaces associated with the user, software service applications related to the application programming interfaces associated with the user, other users associated with the user via application programming interface social network 222, application programming interfaces associated with the other users, and application programming interface consumption prediction models associated with the user. Data processing system 200 utilizes this relationship information located within application programming interface analytics engine 226 to predict which application programming interfaces the particular user may need and then automatically generate a set of application programming interface bundles for that particular user.

Application programming interface analytics engine 226 may be, for example, a noise-tolerant time-varying factor graph that models and predicts application programming interface consumption by each of the plurality of users. Noise-tolerant means that data processing system 200 eliminates or removes non-relevant or low quality application programming interface information from application programming interface analytics engine 226. Time-varying means that data processing system 200 continuously or on a predetermined time interval basis updates application programming interface analytics engine 226 as data processing system 200 obtains or generates new or updated information. Application programming interface analytics engine 226 may simultaneously model the users' application programming interface social network structure, attributes of the users listed within profiles of the users, and an application programming interface consumption history of the users to predict future application programming interface needs of each of the plurality of users.

Learning engine 228 stores and analyzes historical data with regard to information within application programming interface database 218 and application programming interface user database 220. For example, learning engine 228 may capture relationships between different clusters of application programming interface consumers and particular application programming interface developers/providers. Further, learning engine 228 may monitor application programming interface bundle pricing over different periods of time to determine provider pricing trends and to determine consumer purchasing trends. Furthermore, learning engine 228 may monitor negotiations between developers and consumers regarding different application programming interface bundles to identify and learn from successful and failed negotiations.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator. In addition, display 214 may include touch screen capabilities to receive user input.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 258 is located in a functional form on computer readable media 260 that is selectively removable and may be loaded onto or transferred to data processing system 200 for running by processor unit 204. Program code 258 and computer readable media 260 form computer program product 262. In one example, computer readable media 260 may be computer readable storage media 264 or computer readable signal media 266. Computer readable storage media 264 may include, for example, an optical or magnetic disc that is inserted or placed into a drive or other device that is part of persistent storage 208 for transfer onto a storage device, such as a hard drive, that is part of persistent storage 208. Computer readable storage media 264 also may take the form of a persistent storage, such as a hard drive, a thumb drive, or a flash memory that is connected to data processing system 200. In some instances, computer readable storage media 264 may not be removable from data processing system 200.

Alternatively, program code 258 may be transferred to data processing system 200 using computer readable signal media 266. Computer readable signal media 266 may be, for example, a propagated data signal containing program code 258. For example, computer readable signal media 266 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 258 may be downloaded over a network to persistent storage 208 from another device or data processing system through computer readable signal media 266 for use within data processing system 200. For instance, program code stored in a computer readable storage media in a data processing system may be downloaded over a network from the data processing system to data processing system 200. The data processing system providing program code 258 may be a server computer, a client computer, or some other device capable of storing and transmitting program code 258.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 264 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that developers manually grouped application programming interfaces often by the functionality provided by application programming interfaces. In addition, developers grouped application programming interfaces in order to control access to the features of the application programming interface group. Composite application programming interfaces deliver specific business functionality by integrating capabilities of multiple application programming interfaces, which are often developed by multiple independent application programming interface providers.

Illustrative embodiments dynamically bundle application programming interfaces and/or composite application programming interfaces based on current consumption by application programming interface consumers, relationships between the application programming interfaces and composite application programming interfaces, and predicted application programming interface consumption trends by consumers. In addition, illustrative embodiments may bundle application programming interfaces and composite application programming interfaces based on a number of functional and non-functional properties of the application programming interfaces and composite application programming interfaces in an application programming interface marketplace. The functional and non-functional properties may be, for example, capabilities, performance, business requirements, and information technology constraint associated with the application programming interfaces and composite application programming interfaces. Illustrative embodiments utilize the application programming interface marketplace to increase consumption and monetization of the application programming interfaces and composite application programming interfaces.

Illustrative embodiments may cluster application programming interfaces and composite application programming interfaces by using consumption data regarding the application programming interfaces and composite application programming interfaces. For example, illustrative embodiments may generate a vector corresponding to each application programming interface and composite application programming interface as input for clustering of the application programming interfaces and composite application programming interfaces. Illustrative embodiments may utilize different data to generate the vectors, such as, for example, number of invocations of each application programming interface and composite application programming interface, availability of each application programming interface and composite application programming interface, category (e.g. Education Industry) of each application programming interface and composite application programming interface, capabilities embedded in each application programming interface and composite application programming interface, and terms of service brand permission corresponding to each application programming interface and composite application programming interface.

Illustrative embodiments may then compute similarity of or distance between the generated vectors corresponding to the different application programming interfaces and composite application programming interfaces. Illustrative embodiments may apply a k-means clustering algorithm given a set of numeric points in a dimensional space d and an integer k. Illustrative embodiments use the k-means clustering algorithm to generate k or fewer clusters as follows: 1) assign each vector to a cluster at random; 2) repeat process until clusters are stable (i.e., no new clusters are created); 3) compute a centroid for each cluster; and 4) reassign each vector to a nearest centroid.

A similarity function may consist of parameters, such as, for example, quality of service (QoS) availability: number; set of application programming interface capabilities [application programming interface provider, capability] and for each provider: [name, numerical rating]; number of application programming interface consumers: number; and terms of service brand permissions in effect: Boolean. A formal expression of a similarity function may be, for example, ($\Delta$QoS=0.1) & ($\Delta$Rating<0.5) & (Number of invocations>100) & brand permission=false.

Thus, illustrative embodiments of the present invention provide a computer-implemented method, computer system, and computer program product for bundling application programming interfaces. A computer combines related application programming interfaces within a set of application programming interfaces and their corresponding dependent application programming interfaces with related composite application programming interfaces within a set of composite application programming interfaces and their corresponding dependent application programming interfaces to generate a set of application programming interface bundles. The computer prunes the set of application programming interface bundles based on a determined application programming interface budget pattern that corresponds to a selected cluster of application programming interface consumers. The computer prices the pruned set of application programming interface bundles based on an application programming interface bundle pricing model.

Figure 3:
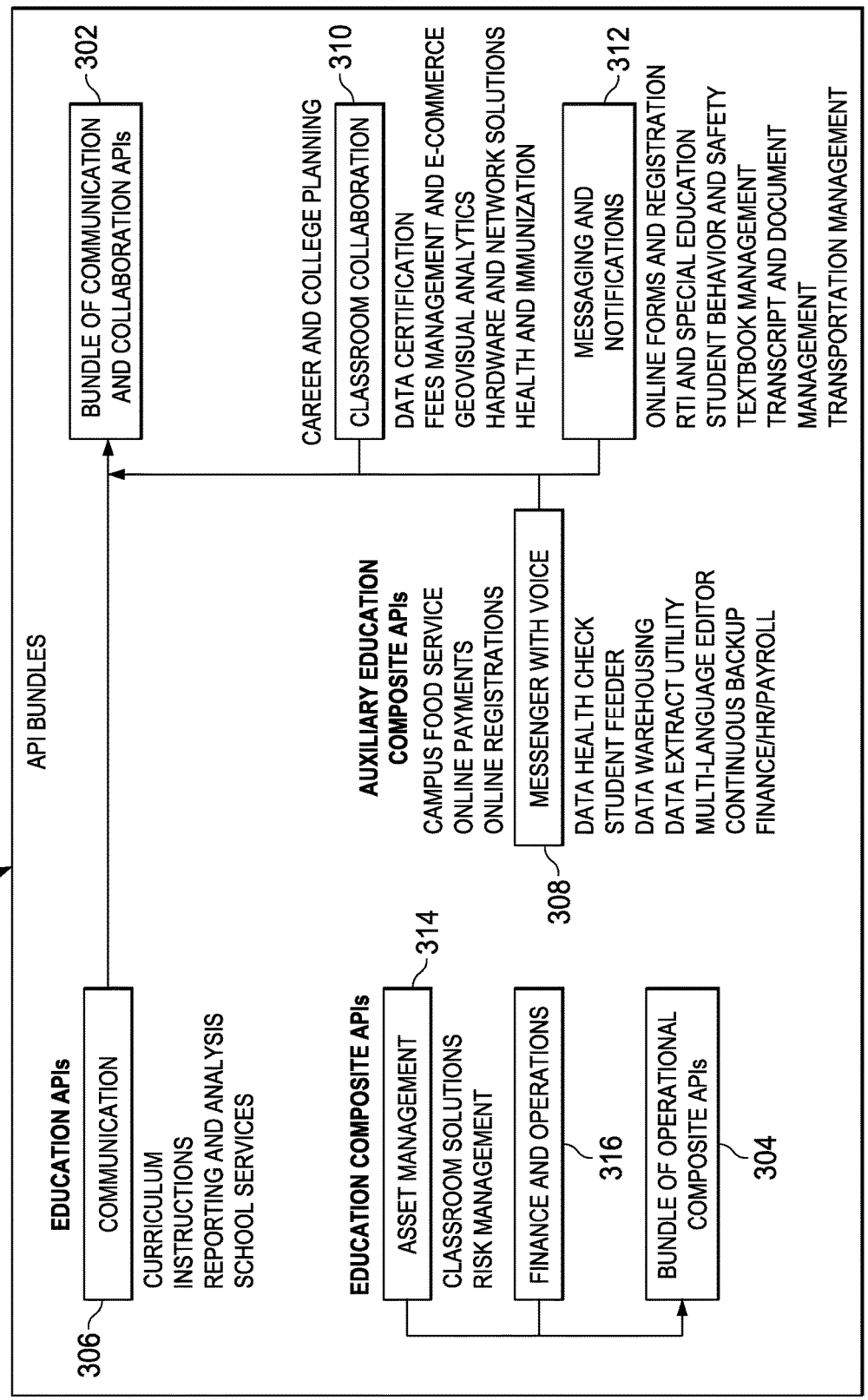
FIG. 3 is a diagram illustrating a specific example of application programming interface bundles in accordance with an illustrative embodiment.

With reference now to FIG. 3, a diagram illustrating a specific example of application programming interface bundles is depicted in accordance with an illustrative embodiment. Application programming interface bundles 300 may be, for example, application programming interface bundles 238 in FIG. 2. In this example, application programming interface bundles 300 include bundle of communication and collaboration application programming interfaces 302 and bundle of operational composite application programming interfaces 304. However, it should be noted that FIG. 3 is only intended as an example and is not intended as a limitation on illustrative embodiments. In other words, application programming interface bundles 300 may include any type or number of application programming interface bundles.

In this example, bundle of communication and collaboration application programming interfaces 302 includes communication 306 application programming interface, messenger with voice 308 application programming interface, classroom collaboration 310 application programming interface, and messaging and notifications 312 application programming interface. Bundle of operational composite application programming interfaces 304 includes asset management 314 composite application programming interface and finance and operations 316 composite application programming interface.

Figure 4B:
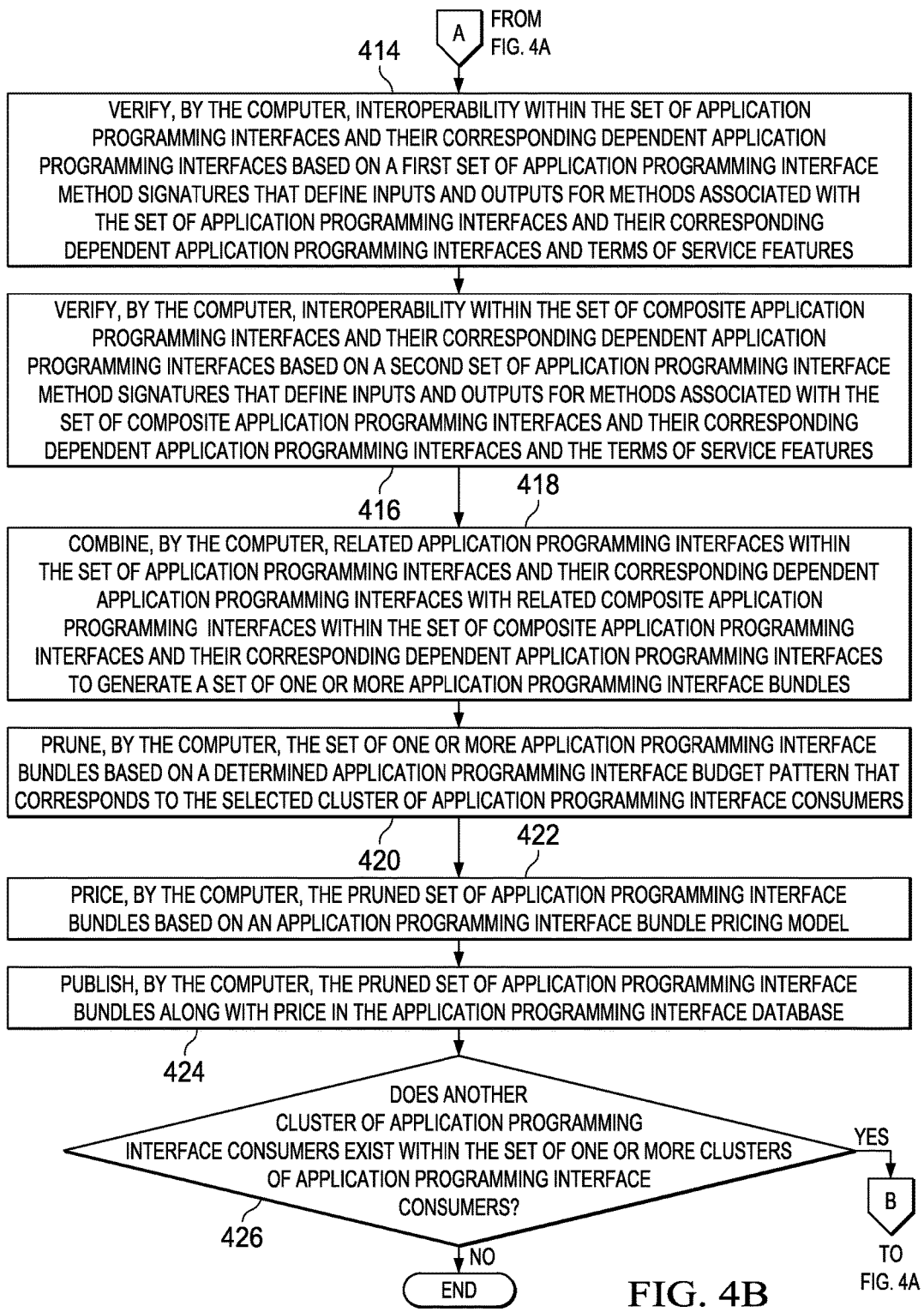

With reference now to FIGS. 4A-4B, a flowchart illustrating a process for bundling application programming interfaces is shown in accordance with an illustrative embodiment. The process shown in FIGS. 4A-4B may be implemented in a computer, such as, for example, server 104 in FIG. 1 or data processing system 200 in FIG. 2.

The process begins when the computer identifies a set of search terms that are frequently used by a plurality of application programming interface consumers on an application programming interface database over a predetermined period of time (step 402). The set of search terms may be, for example, keywords/phrases 252 in FIG. 2. The application programming interface database may be, for example, application programming interface database 218 in FIG. 2.

In addition, the computer generates a set of one or more clusters of application programming interface consumers from the plurality of application programming interface consumers based on the set of search terms frequently used by the plurality of application programming interface consumers, user profiles associated with the plurality of application programming interface consumers, and properties associated with application programming interfaces consumed by the plurality of application programming interface consumers (step 404). The a set of one or more clusters of application programming interface consumers may be, for example, application programming interface consumer clusters 250 in FIG. 2. The user profiles may be, for example, user profiles 242 in FIG. 2. The properties associated with application programming interfaces consumed by the plurality of application programming interface consumers may be, for example, properties 254 included in user consumed application programming interfaces 246 in FIG. 2.

Afterward, the computer selects a cluster of application programming interface consumers within the set of one or more clusters of application programming interface consumers (step 406). Then, the computer retrieves a set of application programming interfaces and a set of composite application programming interfaces consumed by the selected cluster of application programming interface consumers (step 408). It should be noted that the set of application programming interfaces may include zero (0) or more application programming interfaces and the set of composite application programming interfaces may include zero or more composite application programming interfaces. In addition, the computer may utilize an application programming interface analytics engine, such as application programming interface analytics engine 226 in FIG. 2, to predict possible consumption of application programming interfaces and composite application programming interfaces by the cluster of application programming interface consumers. The computer also retrieves dependent application programming interfaces corresponding to the set of application programming interfaces and the set of composite application programming interfaces consumed by the selected cluster of application programming interface consumers (step 410).

Subsequently, the computer merges the dependent application programming interfaces with corresponding application programming interfaces within the set of application programming interfaces and with corresponding composite application programming interfaces within the set of composite application programming interfaces consumed by the selected cluster of application programming interface consumers (step 412). Then, the computer verifies interoperability within the set of application programming interfaces and their corresponding dependent application programming interfaces based on a first set of application programming interface method signatures that define inputs and outputs for methods associated with the set of application programming interfaces and their corresponding dependent application programming interfaces and terms of service features (step 414). Further, the computer verifies interoperability within the set of composite application programming interfaces and their corresponding dependent application programming interfaces based on a second set of application programming interface method signatures that define inputs and outputs for methods associated with the set of composite application programming interfaces and their corresponding dependent application programming interfaces and the terms of service features (step 416).

Afterward, the computer combines related application programming interfaces within the set of application programming interfaces and their corresponding dependent application programming interfaces with related composite application programming interfaces within the set of composite application programming interfaces and their corresponding dependent application programming interfaces to generate a set of one or more application programming interface bundles (step 418). The set of one or more application programming interface bundles may be, for example, application programming interface bundles 238 in FIG. 2. Then, the computer prunes the set of one or more application programming interface bundles based on a determined application programming interface budget pattern that corresponds to the selected cluster of application programming interface consumers (step 420). The determined application programming interface budget pattern that corresponds to the selected cluster of application programming interface consumers may be, for example, an application programming interface budget pattern within application programming interface budget patterns 256 that corresponds to a cluster of application programming interface consumers within application programming interface consumer clusters 250 in FIG. 2.

Further, the computer prices the pruned set of application programming interface bundles based on an application programming interface bundle pricing model (step 422). The application programming interface bundle pricing model may be, for example, application programming interface bundle pricing model 240 in FIG. 2. Furthermore, the computer publishes the pruned set of application programming interface bundles along with price in the application programming interface database (step 424).

Subsequently, the computer makes a determination as to whether another cluster of application programming interface consumers exists within the set of one or more clusters of application programming interface consumers (step 426). If the computer determines that another cluster of application programming interface consumers does exist within the set of one or more clusters of application programming interface consumers, yes output of step 426, then the process returns to step 406 where the computer selects another cluster of application programming interface consumers. If the computer determines that another cluster of application programming interface consumers does not exist within the set of one or more clusters of application programming interface consumers, no output of step 426, then the process terminates thereafter.

With reference now to FIGS. 5A-5B, a flowchart illustrating a process for pricing application programming interface bundles is shown in accordance with an illustrative embodiment. The process shown in FIGS. 5A-5B may be implemented in a computer, such as, for example, server 104 in FIG. 1 or data processing system 200 in FIG. 2.

The process begins when the computer stores a plurality of application programming interface bundles within an application programming interface database (step 502). The application programming interface bundles may be, for example, application programming interface bundles 238 within application programming interface database 218 in FIG. 2. In addition, the computer reviews the plurality of application programming interface bundles stored within the application programming interface database by application programming interface provider specified parameters (step 504). The application programming interface provider specified parameters may be, for example, provider application programming interface parameters 248 in FIG. 2.

Afterward, the computer selects a set of application programming interface bundles to price from the plurality of application programming interface bundles stored within the application programming interface database based on the application programming interface provider specified parameters (step 506). Then, the computer generates a pure bundle price package, a linear bundle price package, and a bonus bundle price package for each application programming interface bundle within the set of application programming interface bundles based on an application programming interface pricing model (step 508).

Further, the computer calculates a time-averaged profit forecast for the pure bundle price package, the linear bundle price package, and the bonus bundle price package corresponding to each application programming interface bundle within the set of application programming interface bundles (step 510). Subsequently, the computer selects an application programming interface bundle within the set of application programming interface bundles based on the time-averaged profit forecast for the pure bundle price package, the linear bundle price package, and the bonus bundle price package corresponding to the selected application programming interface bundle (step 512). Furthermore, the computer reviews application programming interface provider pricing of each application programming interface and composite application programming interface included within the selected application programming interface bundle (step 514).

Then, the computer negotiates the application programming interface provider pricing of each application programming interface and composite application programming interface included within the selected application programming interface bundle with a set of corresponding application programming interface providers (step 516). The computer also computes a bundle price for the selected application programming interface bundle based on the negotiated application programming interface provider pricing of each application programming interface and composite application programming interface included within the selected application programming interface bundle (step 518). In addition, the computer makes a determination as to whether the computed bundle price for the selected application programming interface bundle based on the negotiated application programming interface provider pricing of each application programming interface and composite application programming interface included within the selected application programming interface bundle meets the application programming interface provider specified parameters (step 520).

If the computer determines that the computed bundle price for the selected application programming interface bundle based on the negotiated application programming interface provider pricing of each application programming interface and composite application programming interface included within the selected application programming interface bundle does not meet the application programming interface provider specified parameters, no output of step 520, then the process returns to step 504 where the computer reviews the plurality of application programming interface bundles stored within the application programming interface database by the application programming interface provider specified parameters. If the computer determines that the computed bundle price for the selected application programming interface bundle based on the negotiated application programming interface provider pricing of each application programming interface and composite application programming interface included within the selected application programming interface bundle does meet the application programming interface provider specified parameters, yes output of step 520, then the computer publishes the computed bundle price for the selected application programming interface bundle based on the negotiated application programming interface provider pricing of each application programming interface and composite application programming interface included within the selected application programming interface bundle to the application programming interface database (step 522).

Afterward, the computer makes a determination as to whether the computer should select another application programming interface bundle within the set of application programming interface bundles based on the time-averaged profit forecast (step 524). If the computer determines that the computer should select another application programming interface bundle within the set of application programming interface bundles based on the time-averaged profit forecast, yes output of step 524, then the process returns to step 512, where the computer selects another application programming interface bundle within the set of application programming interface bundles based on the time-averaged profit forecast for the pure bundle price package, the linear bundle price package, and the bonus bundle price package corresponding to the newly selected application programming interface bundle. If the computer determines that the computer should not select another application programming interface bundle within the set of application programming interface bundles based on the time-averaged profit forecast, no output of step 524, then the process terminates thereafter.

Figure 6A:
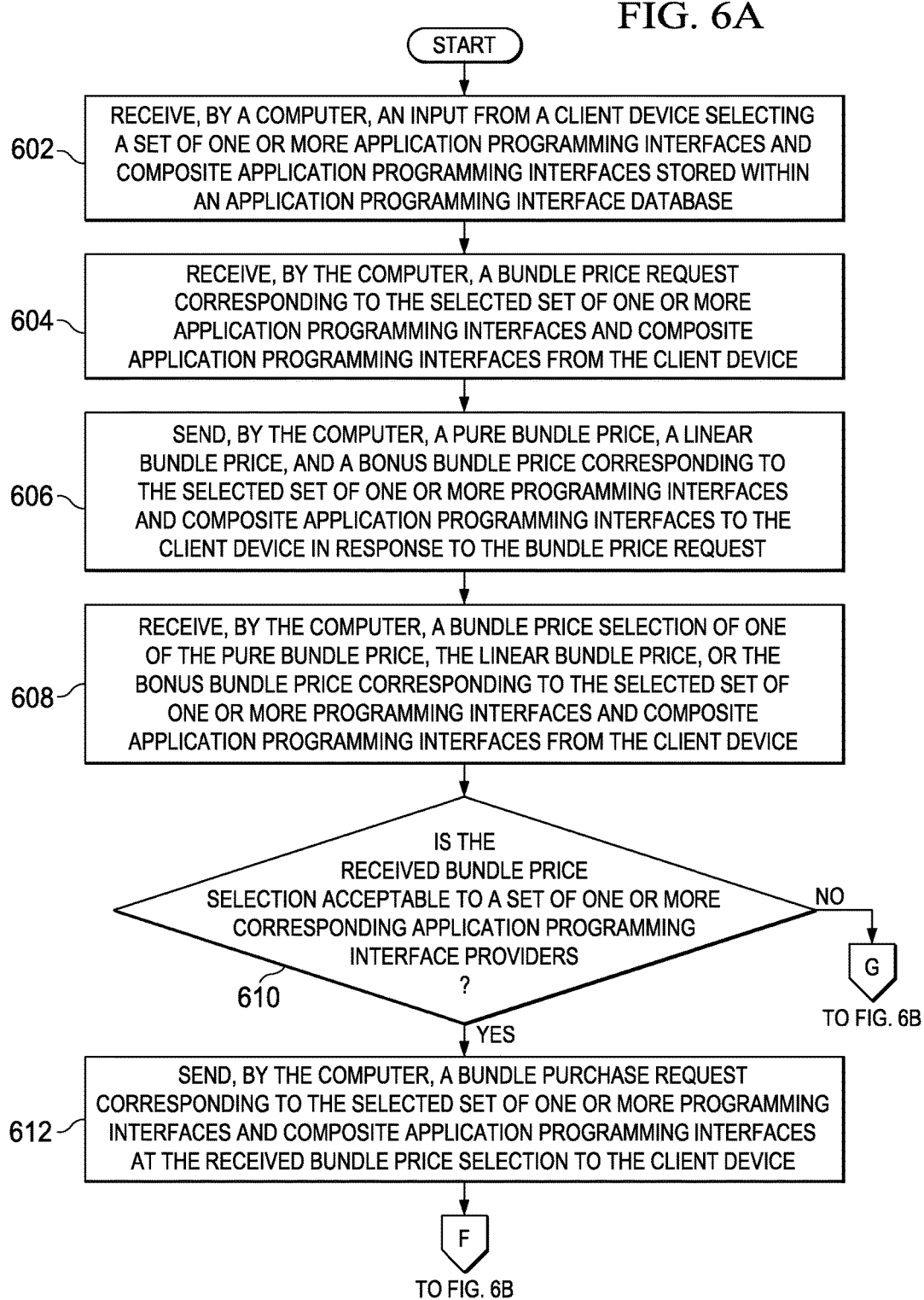
FIGS. 6A-6B are a flowchart illustrating a process for purchasing application programming interface bundles in accordance with an illustrative embodiment.
Figure 6B:
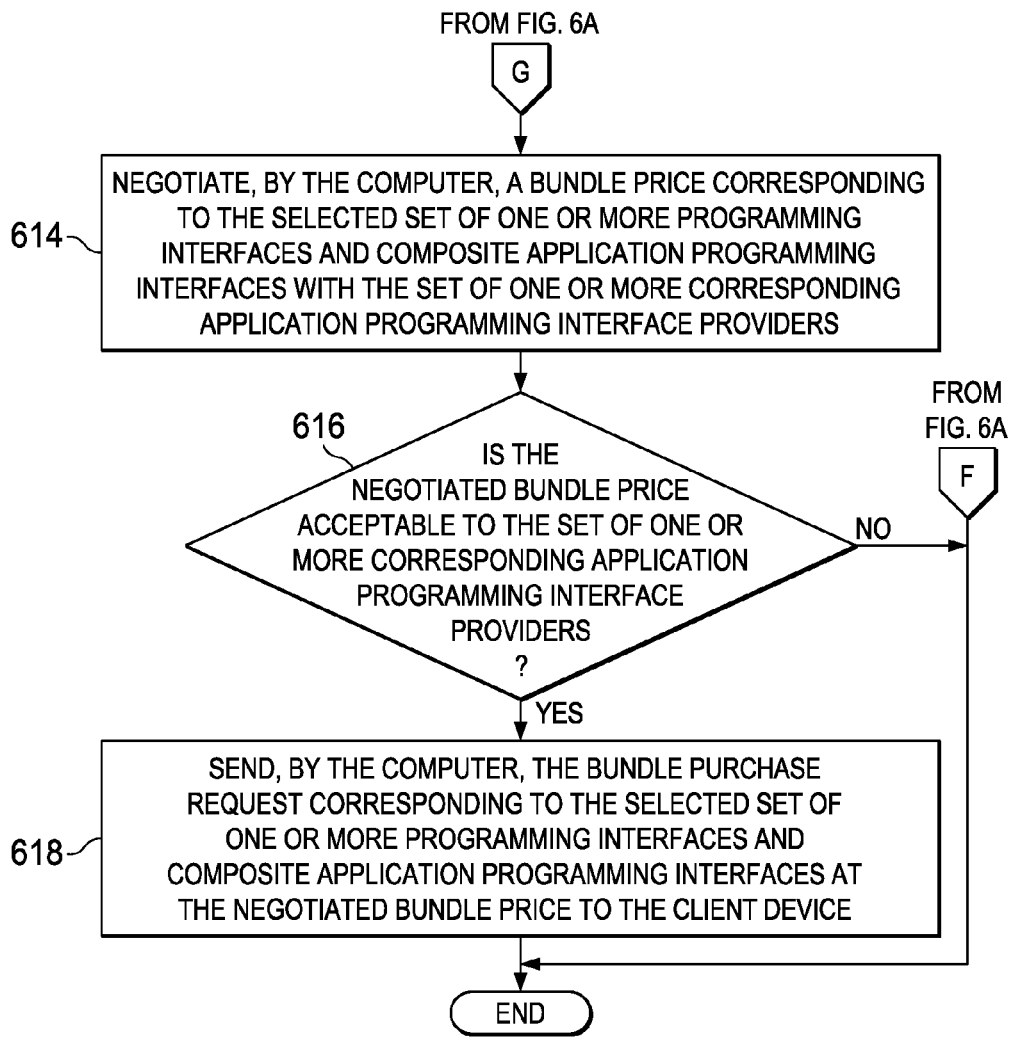

With reference now to FIGS. 6A-6B, a flowchart illustrating a process for purchasing application programming interface bundles is shown in accordance with an illustrative embodiment. The process shown in FIGS. 6A-6B may be implemented in a computer, such as, for example, server 104 in FIG. 1 or data processing system 200 in FIG. 2.

The process begins when the computer receives an input from a client device selecting a set of one or more application programming interfaces and composite application programming interfaces stored within an application programming interface database (step 602). The client device may be, for example, client 110 in FIG. 1. The application programming interfaces and composite application programming interfaces may be, application programming interfaces 230 and composite application programming interfaces 232 stored in application programming interface database 218 in FIG. 2.

In addition, the computer receives a bundle price request corresponding to the selected set of one or more application programming interfaces and composite application programming interfaces from the client device (step 604). The bundle price request may include a consumer's desired budget or the amount of money the consumer is willing to pay for the application programming interface bundle. Afterward, the computer sends a pure bundle price, a linear bundle price, and a bonus bundle price corresponding to the selected set of one or more programming interfaces and composite application programming interfaces to the client device in response to the bundle price request (step 606). The pure bundle price, the linear bundle price, and the bonus bundle price corresponding to the selected set of one or more programming interfaces and composite application programming interfaces may be, for example, bundle price packages included in an application programming interface bundle pricing model.

Subsequently, the computer receives a bundle price selection of one of the pure bundle price, the linear bundle price, or the bonus bundle price corresponding to the selected set of one or more programming interfaces and composite application programming interfaces from the client device (step 608). Afterward, the computer makes a determination as to whether the received bundle price selection is acceptable to a set of one or more corresponding application programming interface providers (step 610). If the computer determines that the received bundle price selection is acceptable to the set of one or more corresponding application programming interface providers, yes output of step 610, then the computer sends a bundle purchase request corresponding to the selected set of one or more programming interfaces and composite application programming interfaces at the received bundle price selection to the client device (step 612). Thereafter, the process terminates.

If the computer determines that the received bundle price selection is not acceptable to the set of one or more corresponding application programming interface providers, no output of step 610, then the computer negotiates a bundle price corresponding to the selected set of one or more programming interfaces and composite application programming interfaces with the set of one or more corresponding application programming interface providers (step 614). Afterward, the computer makes a determination as to whether the negotiated bundle price is acceptable to the set of one or more corresponding application programming interface providers (step 616). If the computer determines that the negotiated bundle price is not acceptable to the set of one or more corresponding application programming interface providers, no output of step 616, then the process terminates thereafter. If the computer determines that the negotiated bundle price is acceptable to the set of one or more corresponding application programming interface providers, yes output of step 616, then the computer sends the bundle purchase request corresponding to the selected set of one or more programming interfaces and composite application programming interfaces at the negotiated bundle price to the client device (step 618). Thereafter, the process terminates.

Thus, illustrative embodiments provide a computer-implemented method, computer system, and computer program product for automatically generating bundles of application programming interfaces. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for bundling application programming interfaces, the computer-implemented method comprising:
   merging, by a computer, dependent application programming interfaces with corresponding application programming interfaces within a set of application programming interfaces and with corresponding composite application programming interfaces within a set of composite application programming interfaces consumed by a selected cluster of application programming interface consumers;
   verifying, by the computer, interoperability within the set of application programming interfaces and their corresponding dependent application programming interfaces based on a first set of application programming interface method signatures that define inputs and outputs for methods associated with the set of application programming interfaces and their corresponding dependent application programming interfaces and terms of service features;
   verifying, by the computer, interoperability within the set of composite application programming interfaces and their corresponding dependent application programming interfaces based on a second set of application programming interface method signatures that define inputs and outputs for methods associated with the set of composite application programming interfaces and their corresponding dependent application programming interfaces and the terms of service features;
   generating, by the computer, a set of application programming interface bundles by combining related application programming interfaces within the set of application programming interfaces and their corresponding dependent application programming interfaces with related composite application programming interfaces within the set of composite application programming interfaces and their corresponding dependent application programming interfaces based on functional and non-functional properties of the related application programming interfaces and the related composite application programming interfaces;
   pruning, by the computer, the set of application programming interface bundles based on a determined application programming interface budget pattern that corresponds to the selected cluster of application programming interface consumers; and
   pricing, by the computer, the pruned set of application programming interface bundles based on an application programming interface bundle pricing model.

2. The computer-implemented method of claim 1, further comprising:
   publishing, by the computer, the pricing of the pruned set of application programming interface bundles in an application programming interface database.

3. The computer-implemented method of claim 1, further comprising:
   generating, by the computer, a set of clusters of application programming interface consumers from a plurality of application programming interface consumers based on a set of search terms frequently used by the plurality of application programming interface consumers, user profiles associated with the plurality of application programming interface consumers, and properties associated with application programming interfaces consumed by the plurality of application programming interface consumers;

selecting, by the computer, a cluster of application programming interface consumers within the set of clusters of application programming interface consumers;

retrieving, by the computer, a set of application programming interfaces and a set of composite application programming interfaces consumed by the selected cluster of application programming interface consumers; and retrieving, by the computer, dependent application programming interfaces corresponding to the set of application programming interfaces and the set of composite application programming interfaces consumed by the selected cluster of application programming interface consumers.

4. The computer-implemented method of claim 1, further comprising:

selecting, by the computer, a set of application programming interface bundles to price from a plurality of application programming interface bundles stored within an application programming interface database based on application programming interface provider specified parameters; and generating, by the computer, a first bundle price package, a second bundle price package, and a third bundle price package for each application programming interface bundle within the set of application programming interface bundles based on the application programming interface pricing model.

5. The computer-implemented method of claim 4, further comprising:

calculating, by the computer, a time-averaged profit forecast for the first bundle price package, the second bundle price package, and the third bundle price package corresponding to each application programming interface bundle within the set of application programming interface bundles.

6. The computer-implemented method of claim 5, further comprising:

selecting, by the computer, an application programming interface bundle within the set of application programming interface bundles based on the time-averaged profit forecast for the first bundle price package, the second bundle price package, and the third bundle price package corresponding to the selected application programming interface bundle; and negotiating, by the computer, application programming interface provider pricing of each application programming interface and composite application programming interface included within the selected application programming interface bundle with a set of corresponding application programming interface providers.

7. The computer-implemented method of claim 6, further comprising:

computing, by the computer, a bundle price for the selected application programming interface bundle based on the negotiated application programming interface provider pricing of each application programming interface and composite application programming interface included within the selected application programming interface bundle.

8. The computer-implemented method of claim 7, further comprising:

publishing, by the computer, the computed bundle price for the selected application programming interface bundle based on the negotiated application programming interface provider pricing of each application programming interface and composite application programming interface included within the selected application programming interface bundle to the application programming interface database.

9. The computer-implemented method of claim 1, further comprising:

receiving, by the computer, a bundle price request corresponding to a selected set of application programming interfaces and composite application programming interfaces from a client device; and sending, by the computer, a first bundle price, a second bundle price, and a third bundle price corresponding to the selected set of programming interfaces and composite application programming interfaces to the client device in response to the bundle price request.

10. The computer-implemented method of claim 9, further comprising:

receiving, by the computer, a bundle price selection of one of the first bundle price, the second bundle price, or the third bundle price corresponding to the selected set of programming interfaces and composite application programming interfaces from the client device; and responsive to the computer determining that the received bundle price selection is not acceptable to a set of corresponding application programming interface providers, negotiating, by the computer, a bundle price corresponding to the selected set of programming interfaces and composite application programming interfaces with the set of corresponding application programming interface providers.

11. The computer-implemented method of claim 10, further comprising:

responsive to the computer determining that the negotiated bundle price is acceptable to the set of corresponding application programming interface providers, sending, by the computer, a bundle purchase request corresponding to the selected set of programming interfaces and composite application programming interfaces at the negotiated bundle price to the client device.

12. A computer system for bundling application programming interfaces, the computer system comprising:

a bus system;

a storage device connected to the bus system, wherein the storage device stores computer readable program code; and a processor unit connected to the bus system, wherein the processor unit executes the computer readable program code to:

merge dependent application programming interfaces with corresponding application programming interfaces within a set of application programming interfaces and with corresponding composite application programming interfaces within a set of composite application programming interfaces consumed by a selected cluster of application programming interface consumers;

verify interoperability within the set of application programming interfaces and their corresponding dependent application programming interfaces based on a first set of application programming interface method signatures that define inputs and outputs for methods associated with the set of application programming interfaces and their corresponding dependent application programming interfaces and terms of service features;

verify interoperability within the set of composite application programming interfaces and their corresponding dependent application programming interfaces based on a second set of application programming interface method signatures that define inputs and outputs for methods associated with the set of composite application programming interfaces and their corresponding dependent application programming interfaces and the terms of service features;

generate a set of application programming interface bundles by combining related application programming interfaces within the set of application programming interfaces and their corresponding dependent application programming interfaces with related composite application programming interfaces within the set of composite application programming interfaces and their corresponding dependent application programming interfaces based on functional and non-functional properties of the related application programming interfaces and the related composite application programming interfaces;

prune the set of application programming interface bundles based on a determined application programming interface budget pattern that corresponds to the selected cluster of application programming interface consumers; and price the pruned set of application programming interface bundles based on an application programming interface bundle pricing model.

13. The computer system of claim 12, wherein the processor unit further executes the computer readable program code to publish the price of the pruned set of application programming interface bundles in an application programming interface database.

14. A computer program product stored on a computer readable storage medium having computer readable program code encoded thereon that is executable by a computer for bundling application programming interfaces, the computer program product comprising:

computer readable program code to merge dependent application programming interfaces with corresponding application programming interfaces within a set of application programming interfaces and with corresponding composite application programming interfaces within a set of composite application programming interfaces consumed by a selected cluster of application programming interface consumers;

computer readable program code to verify interoperability within the set of application programming interfaces and their corresponding dependent application programming interfaces based on a first set of application programming interface method signatures that define inputs and outputs for methods associated with the set of application programming interfaces and their corresponding dependent application programming interfaces and terms of service features;

computer readable program code to verify interoperability within the set of composite application programming interfaces and their corresponding dependent application programming interfaces based on a second set of application programming interface method signatures that define inputs and outputs for methods associated with the set of composite application programming interfaces and their corresponding dependent application programming interfaces and the terms of service features;

computer readable program code to generate a set of application programming interface bundles by combining related application programming interfaces within the set of application programming interfaces and their corresponding dependent application programming interfaces with related composite application programming interfaces within the set of composite application programming interfaces and their corresponding dependent application programming interfaces based on functional and non-functional properties of the related application programming interfaces and the related composite application programming interfaces;

computer readable program code to prune the set of application programming interface bundles based on a determined application programming interface budget pattern that corresponds to the selected cluster of application programming interface consumers; and computer readable program code to price the pruned set of application programming interface bundles based on an application programming interface bundle pricing model.

15. The computer program product of claim 14, further comprising:

computer readable program code to publish the price of the pruned set of application programming interface bundles in an application programming interface database.

16. The computer program product of claim 14, further comprising:

computer readable program code to generate a set of clusters of application programming interface consumers from a plurality of application programming interface consumers based on a set of search terms frequently used by the plurality of application programming interface consumers, user profiles associated with the plurality of application programming interface consumers, and properties associated with application programming interfaces consumed by the plurality of application programming interface consumers;

computer readable program code to select a cluster of application programming interface consumers within the set of clusters of application programming interface consumers;

computer readable program code to retrieve a set of application programming interfaces and a set of composite application programming interfaces consumed by the selected cluster of application programming interface consumers; and computer readable program code to retrieve dependent application programming interfaces corresponding to the set of application programming interfaces and the set of composite application programming interfaces consumed by the selected cluster of application programming interface consumers.

* * * * *